United States Patent
Ciaramita et al.

(10) Patent No.: US 8,417,692 B2
(45) Date of Patent: Apr. 9, 2013

(54) GENERALIZED EDIT DISTANCE FOR QUERIES

(75) Inventors: Massimiliano Ciaramita, Zurich (CH); Amac Herdagdelen, Cambridge, MA (US); Daniel Mahler, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/110,093

(22) Filed: May 18, 2011

(65) Prior Publication Data

US 2011/0295840 A1    Dec. 1, 2011

(30) Foreign Application Priority Data

May 31, 2010  (IT) .............................. MI2010A0986

(51) Int. Cl.
  *G06F 17/30*    (2006.01)
(52) U.S. Cl.
  USPC ............ 707/719; 707/758; 707/767; 709/206
(58) Field of Classification Search .................. 707/767, 707/719, 758
  See application file for complete search history.

(56) References Cited

U.S. PATENT DOCUMENTS

| | | | |
|---|---|---|---|
| 6,233,544 B1 * | 5/2001 | Alshawi ............................. | 704/2 |
| 7,113,950 B2 * | 9/2006 | Brill et al. .............................. | 1/1 |
| 7,496,549 B2 * | 2/2009 | Selvaraj ........................... | 706/25 |
| 7,552,112 B2 | 6/2009 | Jhala et al. | |
| 7,660,806 B2 * | 2/2010 | Brill et al. .............. | 707/999.101 |
| 7,752,220 B2 * | 7/2010 | Weyand et al. ............... | 707/767 |
| 7,925,498 B1 * | 4/2011 | Baker et al. ....................... | 704/9 |
| 8,037,086 B1 * | 10/2011 | Upstill et al. .................. | 707/767 |
| 8,041,730 B1 * | 10/2011 | Upstill et al. .................. | 707/769 |
| 8,086,620 B2 * | 12/2011 | Parikh et al. .................... | 707/765 |
| 2004/0002994 A1 * | 1/2004 | Brill et al. ................... | 707/104.1 |
| 2006/0259442 A1 * | 11/2006 | Iqbal ............................. | 705/400 |
| 2006/0271532 A1 * | 11/2006 | Selvaraj ............................. | 707/5 |
| 2007/0016616 A1 * | 1/2007 | Brill et al. .................. | 707/104.1 |

(Continued)

FOREIGN PATENT DOCUMENTS

WO    WO 2006/104488    10/2006

OTHER PUBLICATIONS

E. Alfonseca et al, "Large-scale Computation of Distributional Similarities for Queries", *Proceedings of North American Chapter of the Association for Computational Linguistics—Human Language Technologies Conference*, pp. 29-32 (Jun. 2009).

(Continued)

*Primary Examiner* — Neveen Abel Jalil
*Assistant Examiner* — Jagdish Pandya
(74) *Attorney, Agent, or Firm* — Fish & Richardson P.C.

(57) ABSTRACT

Methods, systems, and apparatus, including computer programs encoded on a computer storage medium, for determining a generalized edit distance for queries. In one aspect, a method includes selecting query pairs of consecutive queries, each query pair being a first query and a second query consecutively submitted as separate queries, each first and second query including at least one term. For each query pair, the method includes selecting term pairs from the query pair, each term pair being a first term in the first query and a second term in the second query; and determining a co-occurrence value for each term pair. The method also includes determining transition costs based on the co-occurrence values for term pairs, each transition cost indicative of a cost of transitioning from a first term in a first query to a second term in a second query consecutive to the first query.

20 Claims, 5 Drawing Sheets

U.S. PATENT DOCUMENTS

| | | | |
|---|---|---|---|
| 2007/0038621 | A1 | 2/2007 | Weyand et al. |
| 2009/0070323 | A1 | 3/2009 | Parikh et al. |
| 2009/0265230 | A1* | 10/2009 | Plachouras et al. ............ 705/14 |
| 2009/0265290 | A1* | 10/2009 | Ciaramita et al. ............. 706/12 |
| 2011/0106831 | A1* | 5/2011 | Zarzar Charur et al. ...... 707/767 |
| 2012/0036123 | A1* | 2/2012 | Hasan et al. .................. 707/723 |
| 2012/0066195 | A1* | 3/2012 | Lee et al. ..................... 707/706 |

OTHER PUBLICATIONS

E. Aygun, et al., "On Utilizing Optimal and Information Theoretic Syntactic Modeling for Peptide Classification", *In Pattern Recognition in Bioinformatics*, vol. 5780 *of Lecture Notes in Computer Science*, pp. 24-35. Springer Berlin, (2009).

A. Berger et al., "Bridging the Lexical Chasm: Statistical Approaches to Answer-Finding", *At SIGIR '00: Proceedings of the 23rd annual international ACM SIGIR conference on Research and development in information retrieval*, pp. 192-199. ISBN 1-58113-226-3, ACM, (2000).

P. Boldi et al., "From "*Dango*" to "*Japanese cakes*": Query Reformulation Models and Patterns", *IEEE/WIC/ACM International Conference on Web Intelligence and Intelligent Agent Technology—Workshops*, (2009).

D. Bollegala et al., "Measuring Semantic Similarity between Words Using Web Search Engines", *Proceedings of WWW '2007*, pp. 757-766, (2007).

H. Chen et al., "Novel Association Measures using Web Search with Double Checking", *Proceedings of the 21st International Conference on Computational Linguistics and 44th Annual Meeting of the ACL*, pp. 1009-1016, (Jul. 2006).

S. Cucerzan et al., "Query Suggestion based on User Landing Pages," *Proceedings of the 30th annual international ACM SIGIR Conference on Research and Development in Information Retrieval*, pp. 875-876, (2007).

R. Jones et al., "Generating Query Substitutions", *In Proceedings of the 15th International Conference on World Wide Web*, pp. 387-396, (2006).

O. Kolak et al., "OCR Error Correction Using a Noisy Channel Model", *In Proceedings of HLT Association for Computational Linguistics*, pp. 29-32., (2002).

R. Kraft et al., "Mining Anchor Text for Query Refinement", *in Proceedings of the 13th International Conference on World Wide Web*, pp. 666-674, 2004.

S. Needleman et al., "A General Method Applicable to the Search for Similarities in the Amino Acid Sequence of Two Proteins", *Journal of Molecular Biology*, vol. 48, No. 3, pp. 443-453, (1970).

S. Riezler et al., "Translating Queries into Snippets for Improved Query Expansion", *Proceedings of the 22nd International Conference on Computational Linguistics (COLING 2008)*, pp. 737-744 (Aug. 2008).

M. Sahami et al., "A Web-based Kernel Function for Measuring the Similarity of Short Text Snippets", *Proceedings of the 15th International Conference on World Wide Web*, pp. 377-386, (2006).

Search Report from the Italian Patent Office with regard to Application No. MI2010A000986 dated Sep. 13, 2012.

\* cited by examiner

GENERALIZED EDIT DISTANCE FOR QUERIES

CROSS-REFERENCE TO RELATED APPLICATIONS

Pursuant to 35 U.S.C. §119, this application claims the benefit of a foreign priority of Italian Patent Application No. MI2010A000986, filed May 31, 2010, whose disclosure content is hereby incorporated by reference in its entirety.

BACKGROUND

This specification relates to digital information retrieval services.

It is not always easy for users of a search engine to come up with the best query in order to fulfill their information needs. Sometimes they use an ambiguous wording that brings up documents about other senses of the terms used, or they fail to add relevant terms to the query. In order to help in this task, some search services provide query suggestion services that help users reformulate queries to better describe their information needs and reduce the time needed to find information that satisfies their needs. Search services provide search query suggestions as alternatives to search queries input by the users. For example, a search engine can provide a resource that includes a query input field that receives an input search query. In response to receiving search query terms input in the query input field, a search service can provide to the user search query suggestions for the input search query terms. A user can select a search query suggestion for use as a search query.

Additionally, a similar problem may happen with other scenarios where users need to enter query-like text, such as keywords. For example, advertisers provide keywords that have to match user queries for their advertisements to be displayed. Query suggestion systems can also help advertisers by suggesting keywords that are related to the keywords they have entered.

When search services have high confidence that the results shown in response to a user's search query can be improved by extending or replacing the user's search query with a related search query, it is possible to do this replacement automatically with a suggested query, invisible to the user, and directly show the results corresponding to this suggested query, or a combination of the results for the original user search query and the suggested queries. Similarly, advertiser keywords can be automatically extended with synonyms, in order to increase the set of user queries that match an advertiser campaign. These processes are commonly known as "query expansion" and "expanded broad match", respectively.

SUMMARY

This specification describes technologies relating to generating query suggestions, keyword suggestions, query expansions or keyword expanded matches. As used in this specification, the term "query suggestion" is intended to mean any one of a search query suggestion, a keyword suggestion, a query expansion or keyword expansion.

In general, one innovative aspect of the subject matter described in this specification can be embodied in methods that include the actions of selecting query pairs of consecutive queries from user sessions, each query pair being a first query and a second query that were consecutively submitted as separate queries during a search session, each first and second query including at least one term. The method also includes for each query pair selecting term pairs from the query pair, each term pair being a first term in the first query and a second term in the second query; and determining a co-occurrence value for each selected term pair. The method also includes determining transition costs based on the co-occurrence values for term pairs of the query pairs, each transition cost indicative of a cost of transitioning from a first term in a first query to a second term in a second query consecutive to the first query.

Another innovative aspect of the subject matter defined by this specification can be embodied in methods that include the actions of selecting query pairs of queries from user sessions, each query pair being a first query and a second query that were submitted as separate queries during a search session within maximum number of intervening queries, each first and second query including at least one term. The methods also include for each query pair, selecting term pairs from the query pair, each term pair being a first term in the first query and a second term in the second query. The methods also include determining a co-occurrence value for each selected term pair. The methods also include determining transition costs based on the co-occurrence values for term pairs of the query pairs, each transition cost indicative of a cost of transitioning from a first term in a first query to a second term in a second query the is consecutive to the first query.

Another innovative aspect of the subject matter described in this specification can be embodied in systems that include a data processing apparatus, and a memory storing instructions executable by the data processing apparatus that upon such execution cause the data processing apparatus to perform operations including the actions of selecting query pairs of consecutive queries from user sessions, each query pair being a first query and a second query that were consecutively submitted as separate queries during a search session, each first and second query including at least one term. The method also includes for each query pair selecting term pairs from the query pair, each term pair being a first term in the first query and a second term in the second query; and determining a co-occurrence value for each selected term pair. The method also includes determining transition costs based on the co-occurrence values for term pairs of the query pairs, each transition cost indicative of a cost of transitioning from a first term in a first query to a second term in a second query consecutive to the first query.

Another innovative aspect of the subject matter described in this specification can be embodied in a computer storage medium encoded with a computer program, the program comprising instructions that when executed by data processing apparatus cause the data processing apparatus to perform operations including the actions of selecting query pairs of consecutive queries from user sessions, each query pair being a first query and a second query that were consecutively submitted as separate queries during a search session, each first and second query including at least one term. The method also includes for each query pair selecting term pairs from the query pair, each term pair being a first term in the first query and a second term in the second query; and determining a co-occurrence value for each selected term pair. The method also includes determining transition costs based on the co-occurrence values for term pairs of the query pairs, each transition cost indicative of a cost of transitioning from a first term in a first query to a second term in a second query consecutive to the first query.

One or more aspects of the subject matter defined by this specification may optionally one or more of the following actions. A determining the co-occurrence value may include identifying a first set of terms included in the first query and not included in the second query; identifying a second set of terms included the second query and not included in the first query; and for each query pair, in response to identifying the first term is an element of the first set and the second term is an element of the second set, assigning a transition cost inversely proportional to the product of the size of the first set and the size of the second set. Determining transition costs may include for each query term pair aggregating the co-occurrence values determined for the query term pair; determining a probability that the query term pair co-occurs; determining a transition cost based on the probability; and storing the transition cost in a cost-matrix. Determining transition costs may also include normalizing transition costs in the cost-matrix based on at least one of a probability that a first query of the query term pair co-occurs with any query and a probability that a second query of the query term pair co-occurs with any query. Determining transition costs may also include creating multiple cost-matrices, each cost matrix including the transition cost normalized based on a different normalization factor, wherein the normalization factors include the probability that the first query of the query term pair co-occurs with any query, the probability that the second query of the query term pair co-occurs with any query, and the product of the probability that the first query co-occurs with any query and the probability that the second query co-occurs with any query.

The methods may also include the actions of receiving a current query and a plurality of suggested queries, each of the current and suggested queries including one or more terms. The method may also include for each suggested query calculating a transition cost between the suggested query and the current query based on a transition cost of a current term and a suggested term; and selecting a suggested query from the plurality of suggested queries based on the edit distance. Calculating the edit distance may include identifying a value in a cost matrix based on a substitution query pair including the current term and the suggested term. Calculating the edit distance may include identifying values in a plurality of cost matrices based on a substitution query pair including the current term and the suggested term; and averaging the identified values.

Other implementations of this aspect include corresponding systems, apparatus, and computer programs, configured to perform the actions of the methods, encoded on computer storage devices.

Particular implementations of the subject matter described in this specification can be implemented so as to realize one or more of the following advantages. Query suggestions incorporate information-theoretical interpretations of taxonomic relations such as specification and generalization. Query results may be improved though query substitution, and query expansion. Related keywords may be identified. The relevance of advertisement delivered to users may be improved. Query classification can be improved. Query completions may be improved to reflect semantic similarities between entered terms and suggested completions. Query suggestion may be adapted to match user intent in terms of generalization or specialization.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
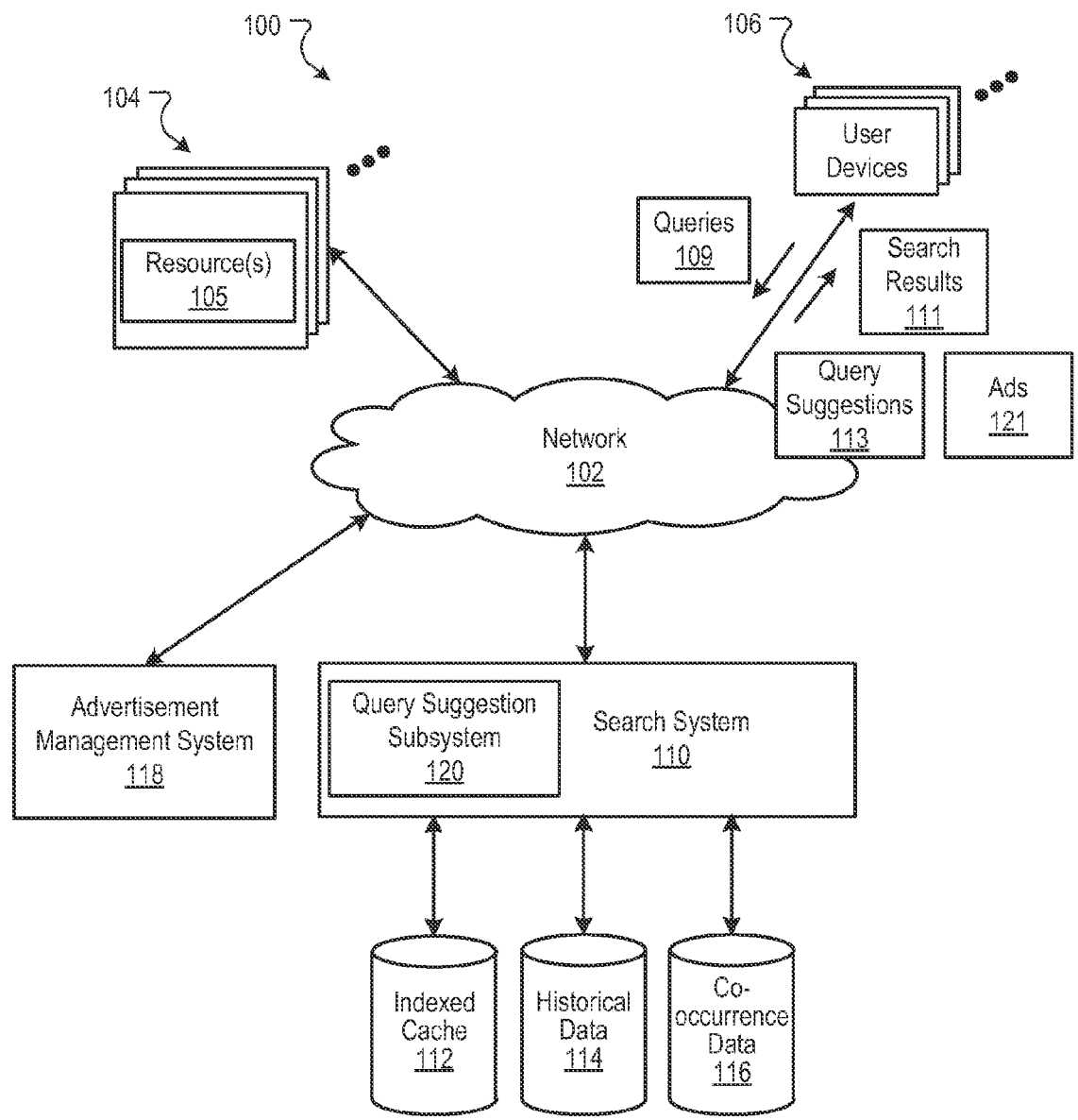
FIG. 1 is a block diagram of an example of an environment in which a search system provides search services.

FIG. 1 is a block diagram of an example of an environment 100 in which a search system provides search services. The example environment 100 includes a network 102, for example, a local area network (LAN), a wide area network (WAN), the Internet, or a combination of them, that connects web sites 104, user devices 106, and the search system 110. The environment 100 may include a large number of web sites 104 and user devices 106.

A web site 104 is one or more resources 105 associated with a domain name and hosted by one or more servers. An example web site is a collection of web pages formatted in the hypertext markup language (HTML). Web pages can contain text, images, multimedia content, and programming elements (e.g., scripts). A web site 104 is generally maintained by a publisher, for example, an entity that manages and/or owns the web site.

A resource 105 is any data that can be provided over the network 102 and that is associated with a resource address. Resources 105 include, for example, HTML pages, word processing documents, portable document format (PDF) documents, images, video, and feed sources. The resources 105 may include content, for example, words, phrases, images and sounds and may include embedded information (e.g., meta information and hyperlinks) and/or embedded instructions (e.g., JavaScript programming code). A resource may, but need not, correspond to a file.

A user device 106 is an electronic device that, in operation, is under the control of a user and is capable of requesting and receiving resources 105 over the network 102. Example user devices 106 include personal computers, mobile communication devices, and other devices that can send and receive data over the network 102. A user device 106 typically includes a user application, for example, a web browser or WAP browser, to facilitate sending and receiving of data over the network 102.

To facilitate searching of resources 105, the search system 110 identifies resources 105 by crawling and indexing the resources 105 provided on web sites 104. Data about the resources 105 can be indexed based on the resource to which the data corresponds. Indexed and cached copies of the resources 105 are stored in an indexed cache 112.

The user devices 106 submit search queries 109 to the search system 110. In response, the search system 110 identifies responsive resources 105 and generates search results 111 that identify the responsive resources 105 and returns the search results 111 to the user devices 106. Each search result 111 identifies a resource 105 that is responsive to a query and includes a link to the resource 105. A search result 111 can include a web page title, a snippet of text or a portion of an image (or thumbnail of the image) extracted from the web page, and the URL of the web page.

In response to receiving a search query 109, the search system 110 accesses historical data 114 and co-occurrence data 116 to identify alternative search queries that are similar to the search query 109 and provides query suggestions 113 to the user device 106.

The user device 106 receives the query suggestions 113, for example, in the form of a collection of one or more alternative search queries, and renders the query suggestions 113 as items contained in a drop-down list element, displayed in combination with an input box element located on a rendered web page or within a browser window. In other implementations, the query suggestions 113 can be presented with the search results 111. For example, the query suggestions 113 can be presented as a list of suggestions rendered at the bottom of a page of search results 111.

In response to a user selecting an alternative search query from among the query suggestions 113, the user device 106 submits the alternative search query to the search system 110 over the network 102. The search system 110 provides search results 111 and, optionally, one or more additional query suggestions 113, in response to the alternative search query.

The user device 106 receives the search results 111, for example, in the form of one or more web pages, and render the search results for presentation to users. In response to the user selecting a link in a search result at a user device 106, the user device 106 may request the resource 105 identified by the link. The web site 104 hosting the resource 105 receives the request for the resource from the user device 106 and provides the resource 105 to the requesting user device 106.

In some implementations, the search system 110 provides search results 111 and query suggestions 113 independent from each other. For example, the search system 110 receives, in addition to a partial query term, each character, number, or symbol of the partial query term or additional query terms of search query 109 as they are entered by the user. In another example, the search system 110 receives, in addition to at least one query term, each additional query term of search query 109 as they are entered by the user. In response to the partially entered search query 109 (e.g., the partial query term or terms), the search system provides query suggestions 113 to the user device 106.

In some implementations, the search system 110 provides search results 111 for a query suggestion in addition to, or in place of the search query 109. When search engines determine that, with high probability, the results shown in response to a user's query could be greatly improved by extending or replacing the user query with a related query, such a replacement can be effected automatically, for example, invisible to the user. In such cases, the results corresponding to a suggested query, or corresponding to a combination of the original and the suggested queries, can be shown.

In some implementations, the search system 110 may also be in data communication with an advertisement management system 118, and can include advertisements that are responsive to the search queries 109 provided by the advertisement management system 118. Alternatively, the search results page can include executable instructions, e.g., JavaScript™ instructions, that can be executed at the user device 106 to request advertisements from the advertisement management system 118. The request can include the search query so that the advertisement management system 118 can provide responsive queries.

In some implementations, the functionality of the query suggestion subsystem 120, described below, can also be incorporated in the advertisement management system 120, or the advertisement management system 120 can communicate with the query suggestion subsystem 120, to extend advertiser keywords to increase the set of user queries that match an advertiser campaign.

Data for the search queries 109 submitted during user sessions are stored in a data store, for example, the historical data store 114. For example, for search queries that are in the form of text, the text of the query is stored in the historical data store 114. Additionally, query suggestions 113 and the queries 109 for which the query suggestions 113 were provided can also be stored in the historical data store 114. The historical data store 114 stores information sufficient to identify the order in which search queries 109 were submitted by users for each user session.

Selection data specifying actions taken in response to search results provided in response to each search query are also stored in the historical data store 114. These actions can include whether a search result 111 was selected, and for each selection, for which search query 109 the search result 111 was provided. These actions can also or alternatively include whether a query suggestion 113 was selected, and for each selection, for which search query 109 the query suggestion 113 was provided.

Users of a search engine need to come up with a suitable search query in order to fulfill their information needs. Search engines support users in this task explicitly and implicitly; explicitly by suggesting related queries or query completions; implicitly by expanding the query to improve quality and recall of results.

In some implementations, queries suggestions 113 are provided in a ranked order, with the highest ranked query suggestion 113 provided first. In other implementations, only one query suggestion is provided, and the selection of the query suggestion to be provided is based on a ranking, example, when determining which query suggestion to use to generate search results.

In some implementations, the ranking is based on a measure of the semantic similarity between the submitted query 109 and the query suggestions 113. For example, the query "become an oral surgeon" may be a better query suggestion for the query "become a dentist" than the query "become a doctor." In turn "become a doctor" may be a better query suggestion than "become a deist."

The query suggestion subsystem 120 is used to determine query suggestions based on a measure of semantic similarity between two search queries. Although described as a subsystem, the query suggestion subsystem 120 can be implemented as an entirely separate system in data communication with the search system 110 or advertisement management system 118.

Figure 2:
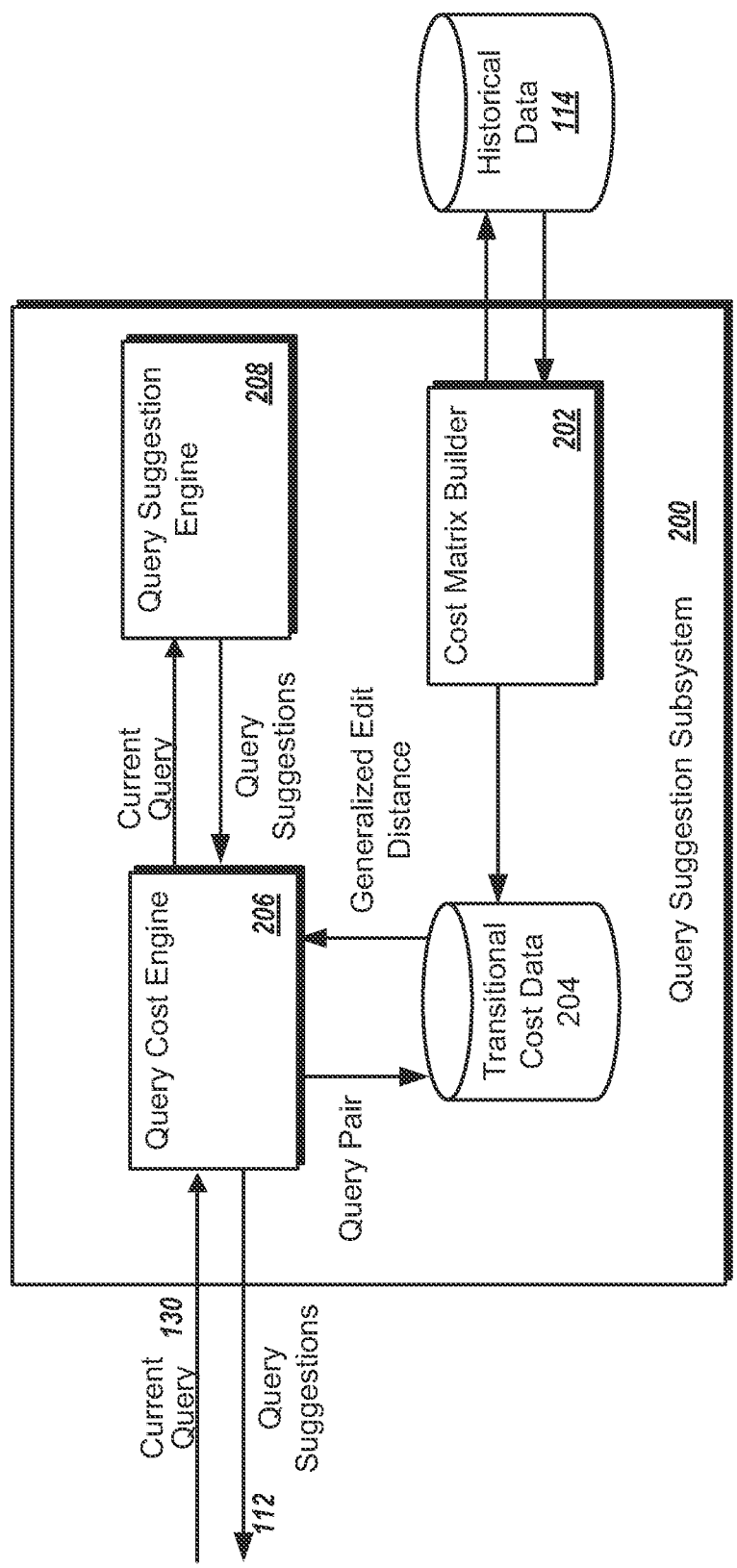
FIG. 2 shows an example of a query suggestion subsystem, which may be used in a search system.

FIG. 2 shows an example of a query suggestion subsystem 200, which may be used in a search system 110. For example, the query suggestion subsystem 200 may be the query suggestion subsystem 120 of FIG. 1. The query suggestion subsystem 200 includes a cost matrix build 202, a transaction cost data store 204, a query cost engine 206, and a query suggestion engine 208. In an example implementation, the transactional cost data store 204 is implemented as a cost matrix data structure. Other data structures, however, may also be used.

The query cost engine 206 receives the current query 130. In some implementations, the current query is provided to a query suggestion engine 208 and the query suggestion engine 208 provides a set of query suggestions. In other implementations, the query suggestions may be provided to the query cost engine 206 along with the current query 130. The query cost engine 206 determines scores for the query suggestions based on a measure of semantic similarity between the current query and each of the query suggestions.

Measures of semantic similarity may include a measure of generalized edit distance between the two queries. Traditional edit distance is a measure of the similarity between two strings. The traditional distance is the number additions, deletions, and substitutions that would be required to transition one term into another. For example, to change "dentist" into "deist" would require two deletions, the "n" and "t" from dentist. Therefore "dentist" to "deist" has a traditional edit distance of 2. Similarly, the transition of "dentist" to "doctor" has a traditional edit distance of 5. The operations required include change the "e" to "o", change the "n" to "c", change the "i" to "o", change the "s" to "r", delete the "t".

Instead of, or in addition to, this traditional approach, the query edit distance subsystem determines edit distance between two queries based on term substitution. For example, a cost is assigned to the substitution of the term "dentist" to "deist." Further, the cost associated with the transformation is not fixed but is weighted based on the semantic similarity of the terms. For example, substituting closely related terms, such as "dentist" and "doctor", have a lower cost, and therefore a shorter distance, than substituting unrelated terms "dentist" and "chicken." The semantic similarity can be determined from the processing of query logs, as will be described in more detail below.

The cost associated with substituting one query term with another may be calculated at runtime; however, more commonly the costs associated with substituting one query term for another are stored in the transactional data store as a cost matrix 204. The cost matrix indexes costs by query term and substitution term, at the intersection of the two terms is the cost associated with the transition. Although the transition cost associated with a single query substitution, the same method may be used to determine a transition cost associated with substituting query phrases or query n-grams. For example, given the queries "be a dentist" and "be a dental assistant", the process could be used to determine a cost for substituting "dentist" with "dental assistant."

The cost matrix 204 is generated by a cost matrix builder 202. The cost matrix builder 202 analyzes user sessions stored in historical data 114 to calculate a measure of semantic similarity between the two queries. The cost is then based on the measure. In some implementations, the cost matrix builder generates the measure by analyzing consecutively submitted queries that are submitted during user sessions. As used herein, consecutively submitted queries are queries following one another in uninterrupted succession or order. For example, for three queries Q1, Q2 and Q3 submitted during a query session, queries Q1 and Q2 and consecutively submitted queries, as are queries Q2 and Q3.

In some implementations, the requirement for strict adjacency between two search queries within a search session can be relaxed slightly, and a gap of one or two intermediate queries may not disqualify the two search queries from being sequential search queries of each other. In some implementations, queries are not disqualified provided the queries are separated by no more than a maximum number of queries (i.e. 2, 3, or 4). For example, if a user submitted three queries (A, B, and C) during a search session, the third search query (e.g., "C") can be a sequential search query of the first search query (e.g., "A") submitted during the search session. In other implementations, the semantic similarity between two queries may be discounted based on the amount of time that passed between their submission.

Pointwise Mutual Information

In some implementations, the measure of semantic similarity includes a measure of pointwise mutual information (PMI). PMI is a measure of the association between two terms or phrases. The PMI for two terms x and y is the logarithm of the probability that the two terms co-occur in the historical data 114 divided by the probability that the first term co-occurs with any other term in the historical data 114 multiplied by the probability that the second term co-occurs with any other term in the historical data 114.

$$PMI(x, y) = \log \frac{p(x, y)}{p(x)p(y)}$$

Where p(x,y) is the probability of the terms co-occurring in the historical data 114, p(x) is the probability of the query term x occurring in the historical data 114, and p(y) is the probability of y occurring in the historical data.

To ensure that substituting two terms occurring together less frequently than random should not be penalized more than two unrelated terms, that is when p(x)p(y) is greater than p(x,y), the PMI value is given a zero lower bound. PMI values of less than zero are assigned the value of 0.

In some implementations, where the requirement for strict adjacency between two search queries within a search session is relaxed the PMI value may be reduced based on the distance between the queries. For example, a weight may be applied to the PMI. The weight may be inversely proportional to amount of time that elapsed between the submitting of queries.

Determining Probabilities

To determine the probability that x and y co-occur, p(x,y), and the probability that x and y occur, p(x) and p(y), the cost matrix builder 202 determines co-occurrence counts based on transitions of consecutive queries stored in the historic data. The co-occurrence value for a term x in the first query and a term y in the second query may be determined by $$n_{x,y}(q_s, q_t) = \begin{cases} 1 & \text{if } x = y \text{ and } x \in q_s \text{ and } y \in q_s \\ \frac{1}{|q'_s||q'_t|} & \text{if } x \in q'_s \text{ and } y \in q'_t \\ 0 & \text{otherwise} \end{cases}$$

Where $n_{x,y}(q_s,q_t)$ is the co-occurrence value for query terms x and y in queries $q_s$ and $q_t$, $q'_s$ is the set of query terms in $q_s$ and not in $q_t$, and $q'_t$ is the set of query terms in $q_t$ and not in $q_s$.

The formula assigns a value of 1 to query terms pairs x and y when x and y are the same. For example, if the term "flower" appears in both queries the formula assigns a co-occurrence value of 1 to the transition from "flower" to "flower". These substitutions are called identity substitutions. Identity substitutions always have the highest co-occurrence value and therefore the lowest transition cost.

In another implementation, certain identity substitutions may be associated with a reduced co-occurrence value if the term is disfavored. For example, common spelling errors may be weeded out by assigning the identity substitution a lower probability and high transition cost. For example, the co-occurrence value for "dentst" and "dentst" may be reduced from 1 to 0, because "dentst" is a known misspelling of dentist.

Figure 3:
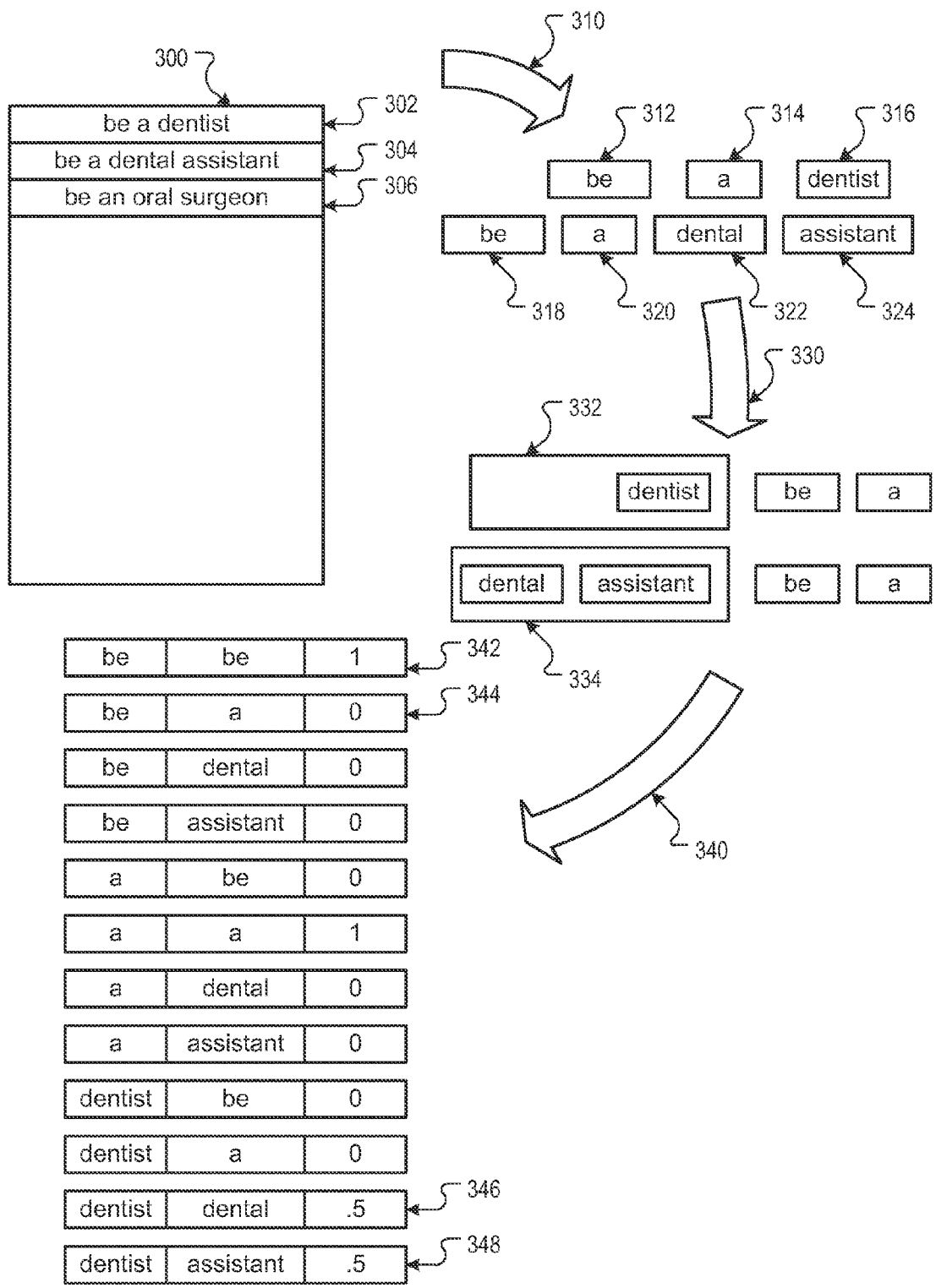
FIG. 3 shows an example of processing a query log to determine co-occurrence counts.

FIG. 3 shows an example of processing a query log to determine co-occurrence counts. A user session log 300, which may be stored, for example, in the historic data 114 of FIG. 1, contains consecutively submitted queries 302, 304, 306. For ease of illustration, only data for one user session is shown. In practice, data from many user sessions are processed.

Represented by process arrow 310, a first query 302 is divided into its terms 312, 314, 316. Similarly a second query 304, submitted consecutive to the first query, is divided into its terms 318, 320, 322, 324.

Represented by process arrow 330, a set first set of terms 332 includes terms which are in the first query 302 and are not in the second query 304. Similarly, a second set of terms 334 includes terms which are in the second query 304 but are not in the first query 302. Applying this example to the formula above $q_s$, is the query 302, "be a dentist", $q_t$ is the query 304 "be a dental assistant", $q'_s$ is the set 332, "dentist", and $q'_t$ is the set 334, "dental, assistant".

Represented by process arrow 340, a co-occurrence value is assigned for each query term pair in the queries 302, 304. For example, the query term "be" appears in both queries 302, 304. Therefore, a co-occurrence record 342 is created for terms "be" and "be" with a co-occurrence value of 1. The query term "be" and "a" both occur in both queries; however, since "be" is not "a" a co-occurrence value of 0 is assigned. In some implementations, co-occurrence values of 0 are not stored.

The query term "dentist" occurs in the first set 332, and the term "dental" occurs in the second set 334. Therefore, a co-occurrence value is determined based on the number of query terms in the first set 332, here 1; and the number of query terms in the second set 334, here 2. In this case the "dentist", "dental" pair is assigned a co-occurrence value of 0.5 or 1 divided by 1 times 2.

Several optimizations to this process are possible. For example, because the number of query terms in the first set 332 and the second set 334 are constant, only a single calculation has to be performed to determine the co occurrence value for each query pair where one query is from the first query and is not in the second query and the other query is in the second query and not in the first query.

Once the first query 302 and the second query 304 are processed, the process continues with the second query 304 and the third query 306.

Once all of the queries are processed, the co-occurrence counts for each query pair are summed.

$$N_{x,y} = \sum_{q_s,q_t} n_{x,y}(q_s, q_t)$$

Where $N_{x,y}$ is the sum of all co-occurrence counts ($n_{x,y}$) for query terms x and y over all consecutive query pairs $q_s$ and $q_t$.

All of the summed co-occurrence counts are summed to obtain a total count.

$$N = \sum_{x,y} N_{x,y}$$

Where N is the total of all summed co-occurrence counts for all queries x and y.

The probability of query term x and query term y co-occurring is the summed co-occurrence count for x and y divided by the total count.

$$p(x, y) = \frac{N_{x,y}}{N}$$

The probability of x co-occurring as the first query term with any other query term is the sum of the so-occurrence values for all query term pairs where x is the first query term divided by the total count.

$$p(x) = \frac{\sum_y N_{x,y}}{N}$$

Similarly, the probability of y co-occurring as the second query term with any other query term is the sum of the so-occurrence values for all query term pairs where y is the second query term divided by the total count.

$$p(y) = \frac{\sum_x N_{x,y}}{N}$$

In other implementations, the probabilities may be identified using an internal clustering model which produces probabilities over strings. Probabilities may also be determined using normalized web document counts.

Normalizing PMI

Once determined, PMI values may be normalized. Provided are three examples of a methods of normalization. One is a symmetric normalization method referred to as joint normalization, and two are asymmetric normalization methods referred to as specialization normalization and generalization normalization. The three normalizations provide a richer representation of the association between two strings. Furthermore, jointly, the asymmetric normalization methods model in an information theoretic sense the generalization-specialization dimension directly, that is how much information is shared between the query terms.

The joint normalized PMI value is a measure of the amount of shared information between the two terms relative to the sum of individual term information. It is calculated by the formula $$PMI(J)(x, y) = \frac{PMI(x, y)}{-\log(p(x, y))}$$

The specialization normalized PMI value generally provides a higher normalized PMI value when the second query term is a specialization of the first one. For example, substituting "macintosh" for "apple" would be preferred over substituting "fruit." Specialization PMI is be calculated by the formula $$PMI(S)(x, y) = \frac{PMI(x, y)}{-\log(p(x))}$$

The generalization normalized PMI value generally provides a higher normalized PMI value when the second query is more general than the first. For example, substituting "fruit" for "apple" would be preferred over "macintosh." It is calculated by the formula $$PMI(G)(x, y) = \frac{PMI(x, y)}{-\log(p(y))}$$

Each of the PMI values is between 0 and 1.

The definitions above can be characterized also in terms of Shannon information $$i(x) = -\log(p(x)).$$

The pointwise mutual information then becomes $$PMI(x,y) = i(x) + i(y) - i(x,y).$$

This shows that PMI(x,y) is the amount of information that is common to both x and Y.

Using this substitution, the joint normalized PMI is described by the formula:

$$PMI(J)(x, y) = \frac{i(x) + i(y) - i(x, y)}{i(x, y)}$$

Therefore the joint normalized PMI is the fraction of total information that is common to x and y.

The specialization normalized PMI is described by the formula:

$$PMI(S)(x, y) = \frac{i(x) + i(y) - i(x, y)}{i(x)}$$

Therefore the specialization normalized PMI is the fraction of information of x that is shared with y.

The generalization normalized PMI is described by the formula:

$$PMI(G)(x, y) = \frac{i(x) + i(y) - i(x, y)}{i(y)}$$

Therefore the generalization normalized PMI is the fraction of information of y that is shared with x.

Calculating the Cost

Once the normalized PMI is determined, the cost matrix builder determines a cost to associate with the transition from one query to the other. In some implementations, the cost is described by the equation:

$$s(x,y) = k - kf(x,y) + \epsilon$$

Where s(x,y) is the normalized PMI between two terms x and y. The value k is the value assigned to an addition and a deletion, for example 1.5, 2, 2.5, or a value with such a range. Other values can also be used. The value $\epsilon$ is a constant value used to ensure that substitution is not preferred to addition and deletion in close cases. f(x,y) is a value based on the pointwise mutual information (PMI) between the terms x and y.

In some implementations, multiple cost matrices are generated. For example, one matrix may be generated for each normalization algorithm, and the value of f(x,y) may be based on an average or some other central tendency of the different normalized PMI values.

In some implementations, the cost matrix used in calculating the transition cost may depend upon a derived intent of the user. If there is evidence that the user is looking for more general results (i.e. would like to see the results of a more general query), then the application can decide to use the cost matrix based on the generalization normalization which will favor more general queries in the suggestion process.

Calculating the Generalized Edit Distance

After the cost matrix is generated and the query cost engine receive a current query and one or more query suggestions. To determine a generalized edit distance the query cost engine compares the terms in the current query to the terms in the query suggestion. In some implementations, the query terms are sorted in order to simplify the comparison. Additions and deletions are assigned a cost k, substitutions are assigned a cost based on the values in the cost matrix. The cost of each transformation is described by the formula $$\forall x, y \in T, C_{GE}(x,y) = s(x,y) \text{ if a and b are not null, k otherwise.}$$

Where x and y are query terms. T is a finite vocabulary which defines the bounds of the cost matrix. $C_{GE}$ is the generalized edit cost, and s(x,y) is the cost described above. The value k is the value assigned to an addition and a deletion, as described above, for example 1.5, 2 2.5, or a value with such a range. Other values can also be used.

Because insertion and deletion have unit cost, a term is substituted only if a substitution is "cheaper" than deleting and inserting another term, namely, if the similarity between the terms is not zero.

In some implementations, in scenarios, e.g., where the search system may be configured to interpret the preferred query suggestions of the user, such as based on user history, then either the joint normalized cost matrix, the specialization normalized cost matrix, or the generalization normalized cost matrix may be used, depending on the user's history. In other scenarios one or more of the cost matrices may be used, for example, the cost of a particular transformation may be averaged as describe above.

Figure 4:
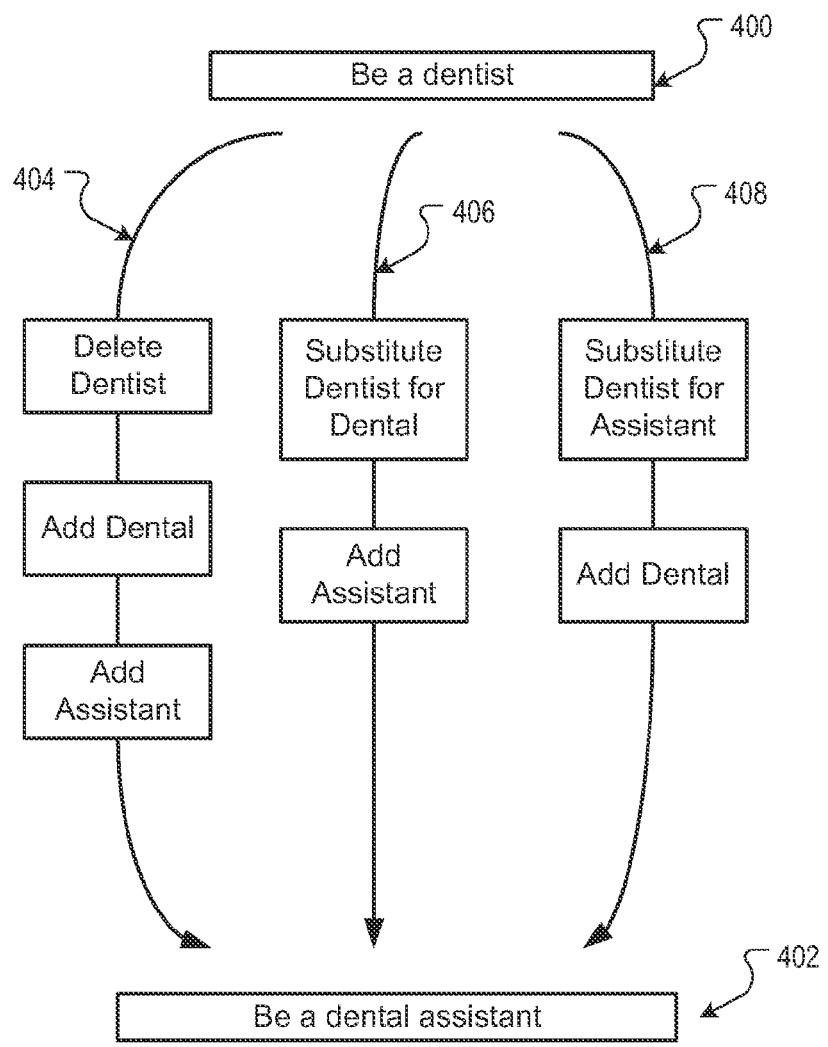
FIG. 4 shows an example of calculating a generalized edit distance.

FIG. 4 shows an example of calculating a generalized edit distance. The transformation of the query "be a dentist" 400 into "be a dental assistant" 402 is an example case. This example shows three potential paths. Path 404 includes the operations "delete dentist" with a cost of k, "add dental" with a cost of k, and "add assistant" with a cost of k. Adding the costs together results in a total cost of 3 k. Another path 406 includes the operations "substitute dentist for dental" with a cost of s("dentist","dental") and "add assistant" with a cost of k. The total cost of the path 406 is s("dental","dental")+k. Another path 408 includes "substitute dentist for assistant" with a cost s("dentist","assistant") and "add dentist" with a cost k. The total cost of the path 408 is s("dentist","assistant")+k. To avoid congestion in the drawings, not all of the necessary comparisons are shown. For example, all of the path 400, 402, and 404 include the implied identity substitution "be" to "be" and "a" to "a". As discussed above, because identity substitutions always have the lowest cost (for example 0), identity substitutions are preferred. In some implementations, identity substitutions are identified prior to calculating the generalized edit distance to improve performance, thereby eliminating the need to perform unnecessary cost calculations.

The total cost for the transformation is the smallest cost for any of the paths.

Figure 5:
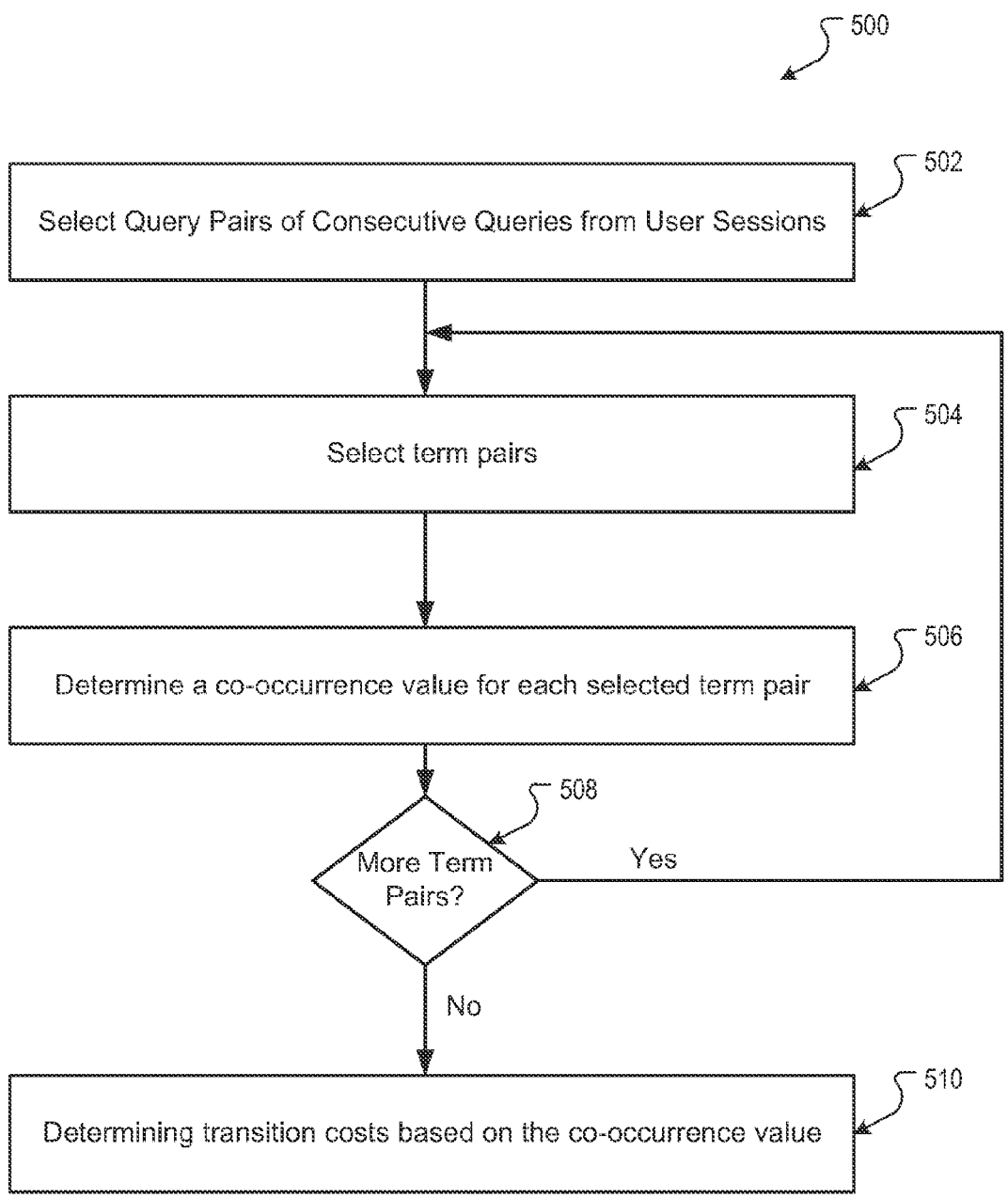
FIG. 5 is a flow chart of an example of a process for determining transition costs between query terms.

FIG. 5 is a flow chart of an example process 500 for determining transition costs between query terms. The example process 500 may be implemented by a search system 110, for example, in the query suggestion subsystem 120 of FIG. 1. For convenience, the process 500 is described with respect to a system that performs process 500.

The process 500 selects query pairs of consecutive queries from user sessions (502). User sessions contain sequential queries submitted by a user. A pair of queries is selected for analysis. The first query is immediately preceding the second query in the user session. This method permits the system to capture query refinements. A query refinement is a modification to a query to try to achieve improved search results. For example, a user attempting to find a dentist to perform a root canal may enter the initial query "local dentist" and then subsequently "local endodontist." Such query pairs may exist many times over many user sessions for different users.

The process selects term pairs (504). Each pair of terms, one term from the first query and one term from the second query are processed. Using the example above the term pairs are ("local", "local"), ("local", "endodontist"), ("dentist", "local"), and ("dentist", "endodontist").

The process determines a co-occurrence value for each selected term pair. (506). The co-occurrence value is a measure of how well one term may be substituted for another. For example, in the query "local dentist" and "local endodontist" the term "dentist" was removed and the term "endodontist" was added.

In some implementations, the removed terms are identified as a first set of terms and the added terms are identified as a second set of terms. The system determines that endodontist is a substitution for dentist. Since one term was removed and one term is added, the system assigns a co-occurrence value of 1 to the substitution. In another example, the query "become a computer technician" is followed by the query "become a systems programmer." In this case, two terms were removed and two were added. Any given combination has only a 25% of being a proper substitution, e.g. computer could have been changed to systems or programmer, and technician could have been changed to computer or programmer. Therefore, each possibility is assigned a reduced value, here 0.25.

The process determines if there are more pairs to process (508). If there are more pairs to process, the process returns to stage 504. Otherwise, the process determines transition costs based on the co-occurrence values (510). As discussed above once the query pairs are processed a co-occurrence value may be determined based on the collected data. In general, the co-occurrence value is bounded between 0 and 1, 0 indicating that there is no relationship between the terms and 1 indicating they are interchangeable synonyms. Determining the transition cost may include aggregating all of the co-occurrence values for each query term pair.

Although the process described in terms of query suggestions as part of a search operation, the process described above can also be used for semantic substitutions and expansions. For example, the process can be used for keyword expansion, for example, it can identify advertising keywords which are related to the keywords supplied by an advertiser.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
    selecting query pairs of queries from user sessions, each query pair being a first query and a second query that were submitted as separate queries during a search session with up to a maximum number of intervening queries between the first query and the second query, each first and second query including at least one term;
    for each query pair:
        selecting term pairs from the query pair, each term pair being a first term in the first query and a second term in the second query;
        determining a co-occurrence value for each selected term pair, the determining comprising:
            identifying a first set of terms included in the first query and not included in the second query,
            identifying a second set of terms included the second query and not included in the first query, and
            for the selected term pair, in response to identifying the first term is an element of the first set and the second term is an element of the second set,
        determining the co-occurrence value based on the size of the first set and the size of the second set; and
    determining transition costs based on the co-occurrence values for term pairs of the query pairs, each transition cost indicative of a cost of transitioning from a first term in a first query to a second term in a second query.

2. The method of claim 1, wherein determining the co-occurrence value based on the size of the first set and the size of the second set comprises:
    determining a co-occurrence value that is inversely proportional to the product of the size of the first set and the size of the second set.

3. The method of claim 1, wherein determining transition costs comprises:
    for each term pair:
        aggregating the co-occurrence values determined for the term pair over all query pairs;
        determining a probability that the term pair co-occurs;
        determining a transition cost based on the probability; and storing the transition cost in a cost-matrix.

4. The method of claim 1 further comprising:
receiving a current query and a plurality of suggested queries, each of the current and suggested queries including one or more terms;
for each suggested query:
calculating a transition cost between the suggested query and the current query based on a transition cost of a current term and a suggested term; and
selecting a suggested query from the plurality of suggested queries based on the edit distance.

5. The method of claim 4 wherein calculating the edit distance comprises:
identifying a value in a cost matrix based on a substitution query pair including the current term and the suggested term.

6. The method of claim 4 wherein calculating the edit distance comprises:
identifying values in a plurality of cost matrices based on a substitution query pair including the current term and the suggested term; and
averaging the identified values.

7. The method of claim 1, wherein the first query and the second query are consecutive.

8. A computer-implemented method performed by a data processing apparatus, the method comprising:
selecting query pairs of queries from user sessions, each query pair being a first query and a second query that were submitted as separate queries during a search session with a maximum number of intervening queries between the first query and the second query, each first and second query including at least one term;
for each query pair:
selecting term pairs from the query pair, each term pair being a first term in the first query and a second term in the second query;
determining a co-occurrence value for each selected term pair; and
determining transition costs based on the co-occurrence values for term pairs of the query pairs, each transition cost indicative of a cost of transitioning from a first term in a first query to a second term in a second query
wherein determining transition costs comprises:
for each term pair:
aggregating the co-occurrence values determined for the term pair over all query pairs;
determining a probability that the term pair co-occurs;
determining a transition cost based on the probability; and
storing the transition cost in a cost-matrix;
wherein determining transition costs further comprises:
normalizing transition costs in the cost-matrix based on at least one of a probability that a first query of the term pair co-occurs with any query and a probability that a second query of the term pair co-occurs with any query.

9. The method of claim 8, wherein determining transition costs further comprises:
creating multiple cost-matrices, each cost matrix including the transition cost normalized based on a different normalization factor, wherein the normalization factors include the probability that the first query of the term pair co-occurs with any query, the probability that the second query of the term pair co-occurs with any query, and the product of the probability that the first query co-occurs with any query and the probability that the second query co-occurs with any query.

10. A system comprising:
a data processing apparatus, and
a memory storing instructions executable by the data processing apparatus that upon such execution cause the data processing apparatus to perform operations comprising:
selecting query pairs of queries from user sessions, each query pair being a first query and a second query that were submitted as separate queries during a search session with up to a maximum number of intervening queries between the first query and the second query, each first and second query including at least one term;
for each query pair:
selecting term pairs from the query pair, each term pair being a first term in the first query and a second term in the second query;
determining a co-occurrence value for each selected term pair, the determining comprising:
identifying a first set of terms included in the first query and not included in the second query,
identifying a second set of terms included the second query and not included in the first query, and
for the selected term pair, in response to identifying the first term is an element of the first set and the second term is an element of the second set, determining a co-occurrence value based on the size of the first set and the size of the second set; and
determining transition costs based on the co-occurrence values for term pairs of the query pairs, each transition cost indicative of a cost of transitioning from a first term in a first query to a second term in a second query.

11. The system of claim 10, wherein determining the co-occurrence value based on the size of the first set and the size of the second set comprises: determining a co-occurrence value that is inversely proportional to the product of the size of the first set and the size of the second set.

12. The system of claim 10, wherein determining transition costs comprises:
for each term pair:
aggregating the co-occurrence values determined for the term pair over all query pairs;
determining a probability that the term pair co-occurs;
determining a transition cost based on the probability; and
storing the transition cost in a cost-matrix.

13. The system of claim 10 further comprising:
receiving a current query and a plurality of suggested queries, each of the current and suggested queries including one or more terms;
for each suggested query:
calculating a transition cost between the suggested query and the current query based on a transition cost of a current term and a suggested term; and
selecting a suggested query from the plurality of suggested queries based on the edit distance.

14. The system of claim 13 wherein calculating the edit distance comprises:
identifying a value in a cost matrix based on a substitution query pair including the current term and the suggested term.

15. The system of claim 13 wherein calculating the edit distance comprises:
identifying values in a plurality of cost matrices based on a substitution query pair including the current term and the suggested term; and
averaging the identified values.

16. The system of claim 10, wherein the first query and the second query are consecutive.

17. A system comprising:
a data processing apparatus, and
a memory storing instructions executable by the data processing apparatus that upon such execution cause the data processing apparatus to perform operations comprising:
selecting query pairs of queries from user sessions, each query pair being a first query and a second query that were submitted as separate queries during a search session with up to a maximum number of intervening queries between the first query and the second query, each first and second query including at least one term;
for each query pair:
selecting term pairs from the query pair, each term pair being a first term in the first query and a second term in the second query;
determining a co-occurrence value for each selected term pair; and
determining transition costs based on the co-occurrence values for term pairs of the query pairs, each transition cost indicative of a cost of transitioning from a first term in a first query to a second term in a second query
wherein determining transition costs further comprises:
normalizing transition costs in the cost-matrix based on at least one of a probability that a first query of the term pair co-occurs with any query and a probability that a second query of the term pair co-occurs with any query.

18. The system of claim 17, wherein determining transition costs further comprises:
creating multiple cost-matrices, each cost matrix including the transition cost normalized based on a different normalization factor, wherein the normalization factors include the probability that the first query of the term pair co-occurs with any query, the probability that the second query of the term pair co-occurs with any query, and the product of the probability that the first query co-occurs with any query and the probability that the second query co-occurs with any query.

19. A computer-readable storage device encoded with a computer program, the program comprising instructions that when executed by data processing apparatus cause the data processing apparatus to perform operations comprising:
selecting query pairs of queries from user sessions, each query pair being a first query and a second query that were submitted as separate queries during a search session with up to a maximum number of intervening queries between the first query and the second query, each first and second query including at least one term;
for each query pair:
selecting term pairs from the query pair, each term pair being a first term in the first query and a second term in the second query;
determining a co-occurrence value for each selected term pair, the determining comprising:
identifying a first set of terms included in the first query and not included in the second query,
identifying a second set of terms included the second query and not included in the first query, and
for the selected term pair, in response to identifying the first term is an element of the first set and the second term is an element of the second set, determining a co-occurrence value based on the size of the first set and the size of the second set; and
determining transition costs based on the co-occurrence values for term pairs of the query pairs, each transition cost indicative of a cost of transitioning from a first term in a first query to a second term in a second query.

20. A computer-readable storage device encoded with a computer program, the program comprising instructions that when executed by data processing apparatus cause the data processing apparatus to perform operations comprising:
selecting query pairs of queries from user sessions, each query pair being a first query and a second query that were submitted as separate queries during a search session with up to a maximum number of intervening queries between the first query and the second query, each first and second query including at least one term;
for each query pair:
selecting term pairs from the query pair, each term pair being a first term in the first query and a second term in the second query;
determining a co-occurrence value for each selected term pair; and
determining transition costs based on the co-occurrence values for term pairs of the query pairs, each transition cost indicative of a cost of transitioning from a first term in a first query to a second term in a second query
wherein determining transition costs comprises:
for each term pair:
aggregating the co-occurrence values determined for the term pair over all query pairs;
determining a probability that the term pair co-occurs;
determining a transition cost based on the probability; and
storing the transition cost in a cost-matrix;
wherein determining transition costs further comprises:
normalizing transition costs in the cost-matrix based on at least one of a probability that a first query of the term pair co-occurs with any query and a probability that a second query of the term pair co-occurs with any query.

* * * * *